United States Patent [19]
Fukuma et al.

[11] 4,147,965
[45] Apr. 3, 1979

[54] SWITCHING DEVICE FOR FEEDER IN MACHINE TOOLS

[75] Inventors: Nobuo Fukuma, Toyota; Yoshito Kato, Aichi; Kouji Nogami, Toyota, all of Japan

[73] Assignee: Toyota Jidosha Kogyo Kabushiki Kaisha, Aichi, Japan

[21] Appl. No.: 835,648

[22] Filed: Sep. 22, 1977

[30] Foreign Application Priority Data

Sep. 22, 1976 [JP] Japan ................ 51-127720[U]

[51] Int. Cl.² ........................................ H02M 1/02
[52] U.S. Cl. ................................. 318/256; 318/293
[58] Field of Search ................... 318/256, 293, 287

[56] References Cited
U.S. PATENT DOCUMENTS

| | | | |
|---|---|---|---|
| 3,290,575 | 12/1966 | Modiano | 318/293 |
| 3,684,945 | 8/1972 | Hermansson et al. | 318/293 |

*Primary Examiner*—Herman Hohauser
*Attorney, Agent, or Firm*—Koda and Androlia

[57] ABSTRACT

A directional switching device for a feeder in a machine tool driven by a direct current motor. The armature circuit of the direct current motor is provided with a relay contact circuit for switching the forward and backward movements of the conveyor. The relay contact circuit is controlled by signals from a sequencing circuit.

6 Claims, 3 Drawing Figures

SWITCHING DEVICE FOR FEEDER IN MACHINE TOOLS

BACKGROUND OF THE INVENTION

1. Field of the Invention

The present invention relates to a directional switching device for a feeder in a machine tool, and more particularly, to an improved directional switching device for a feeder in a machine tool driven by a direct current motor.

2. Prior Art

Generally, oil pressure cylinder type devices are employed for driving feeders to move machine axles, work tables and the like to prescribed positions. The oil pressure type cylinder device has several advantages such as relative ease of control and great driving power which makes it suitable as a thrust generator device in a feeder. However, its drawbacks include unstable feeder control caused by temperature variations and the use of compressive fluids, which affect productivity and durability of the machinery. In addition it presents such environmental problems as oil leaks and noise.

As opposed to conventional oil pressure cylinder devices, a motor driven feeder method has been proposed. However this method does not completely satisfy the advantages derived by the oil pressue cylinder method in that, particularly with respect to alternating current (A.C.) motors, simple changes in rotational speeds are difficult to achieve which necessitates expensive and complex gear boxes and the like to be installed. Another drawback is the difficulty in securing and maintaining a prescribed stopping position of the feeder which causes inaccurate forward and backward movements and mechanical friction which results in a shorter machine life.

As opposed to these drawbacks associated with the A.C. motor, the direct current (D.C.) motor is more favorable, although it too has disadvantages such as a complex circuit structure for switching the rotational direction, i.e., the direction in which the feeder moves. In the conventional D.C. motor the D.C. current is supplied to the motor's armature by a D.C. bridge made up of four transistors. By a switch controlling the transistor bridge circuit, flow of the armature current is reversed thereby switching the rotational direction. Thus, the structure of the control circuit in the conventional D.C. motor driven device is not only more complex but also requires a protective circuit in order to control any abnormal excessive voltage that is generated when the circuit is stopped for reversing action. Because of this and other drawbacks the D.C. motor has been employed only in special machines such as NC machinery which is equipped with expensive control devices.

SUMMARY OF THE INVENTION

Accordingly it is a general objective to provide a directional switching device for a feeder in a machine tool utilizing a direct current motor capable of accurately switching the direction of feed by means of an exceedingly simple system.

In keeping with the principles of the present invention, the objects are accomplished by a unique directional switching device for a feeder in a machine tool driven by a direct current motor. The armature circuit in the direct current motor is coupled to a relay contact circuit for switching the forward and backward movements of the feeder. In addition, the relay contact circuit is controlled by signals from a sequencing circuit.

BRIEF DESCRIPTION OF THE DRAWINGS

The above mentioned features and objects of the present invention will become more apparent by reference to the following description taken in conjunction with the accompanying drawings. Wherein like reference numerals denote like elements, and in which.

DETAILED DESCRIPTION OF THE INVENTION

Figure 1:
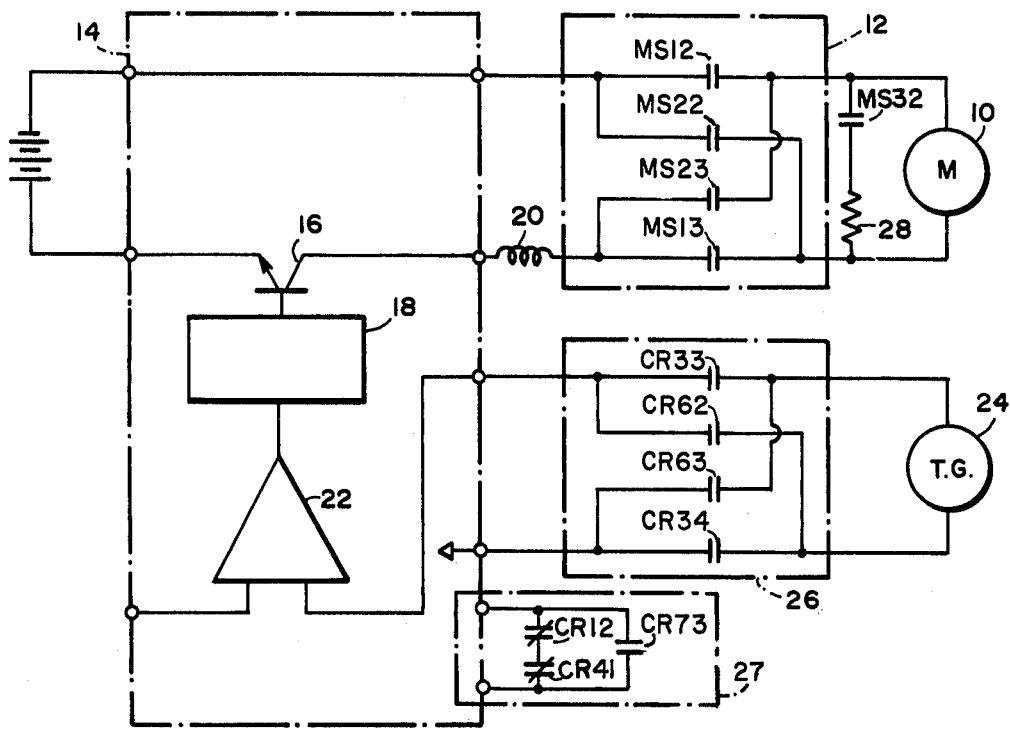
FIG. 1 is an outline of the circuitry for a directional switching device for a feeder in a machine tool in accordance with the teachings of the present invention.

Referring to FIG. 1, the directional switching device for a feeder in a machine tool includes a DC motor coupled to a well known feeder (not shown). The motor 10 moves the feeder at a prescribed speed and provides a desired force to the feeder. Direct current is supplied to the armature of the motor 10 via a relay contact circuit 12 and a serial control circuit 14. Servo control circuit 14 contains an output transistor 16 whose collector-emitter is coupled in series with the armature circuit of the motor 10.

Base driving current from a driving circuit 18 is supplied to the base of transistor 16 thereby providing desired control signals to transistor 16 in response to load conditions, speed and power instructions. Transistor 16 controls the intermittent flow of armature current thereby controls the amount of current supplied to motor 10 according to its duty cycle. An inductance 20 is inserted into the armature circuit of the motor 10 and evens out the intermittent flow of direct current from the servo control circuit 14 which is passed on to the relay contact circuit 12 and supplied to the motor 10.

Driving circuit 18 is controlled by the output from a comparator 22 which receives control signals from the outside. A tachometer generator 24 is directly coupled to the axle of motor 10 and is provided adjacent thereto for the purpose of counting the rotational speed of the motor 10 at all times. The count is supplied to servo control circuit 14 via relay contact circuit 26 which then instructs comparator 22 and others of the rotational speed of motor 10. Servo control circuit 14 also has an interlocking circuit 27 for shutting off the base current of transistor 16 so as to prevent unnecessary rotation of motor 10 when it must stop. Relay contact circuit 12 contains two sets of interlocking contacts $MS_{12}$ and $MS_3$ and $MS_{22}$ and $MS_{23}$. Relay contact circuit 26, coupled to tachometer generator 24, also contains two sets of interlocking relay contacts $CR_{33}$ and $CR_{34}$ and $CR_{64}$ and $CR_{62}$. Interlocking circuit 27 includes "b" contacts $CR_{12}$ and $CR_{41}$ and "a" contacts $CR_{73}$, the later being coupled in parallel with the "b" contacts. A damping resistance 38 is coupled to motor 10 via contact $MS_{32}$ to form a closed circuit for dynamo breaking when the motor 10 is to be stopped. The relay contacts $MS_{12}$ and $MS_{13}$ and $CR_{33}$ and $CR_{34}$ within the relay contact circuits 12 and 26, respectively, are actuated when a command is received to rotate motor 10 forward. Contacts $MS_{22}$ and $MS_{23}$ and $CR_{62}$ and $CR_{23}$ are activated to cause the motor to rotate in a reverse direction when a reverse command is received.

Figure 2:
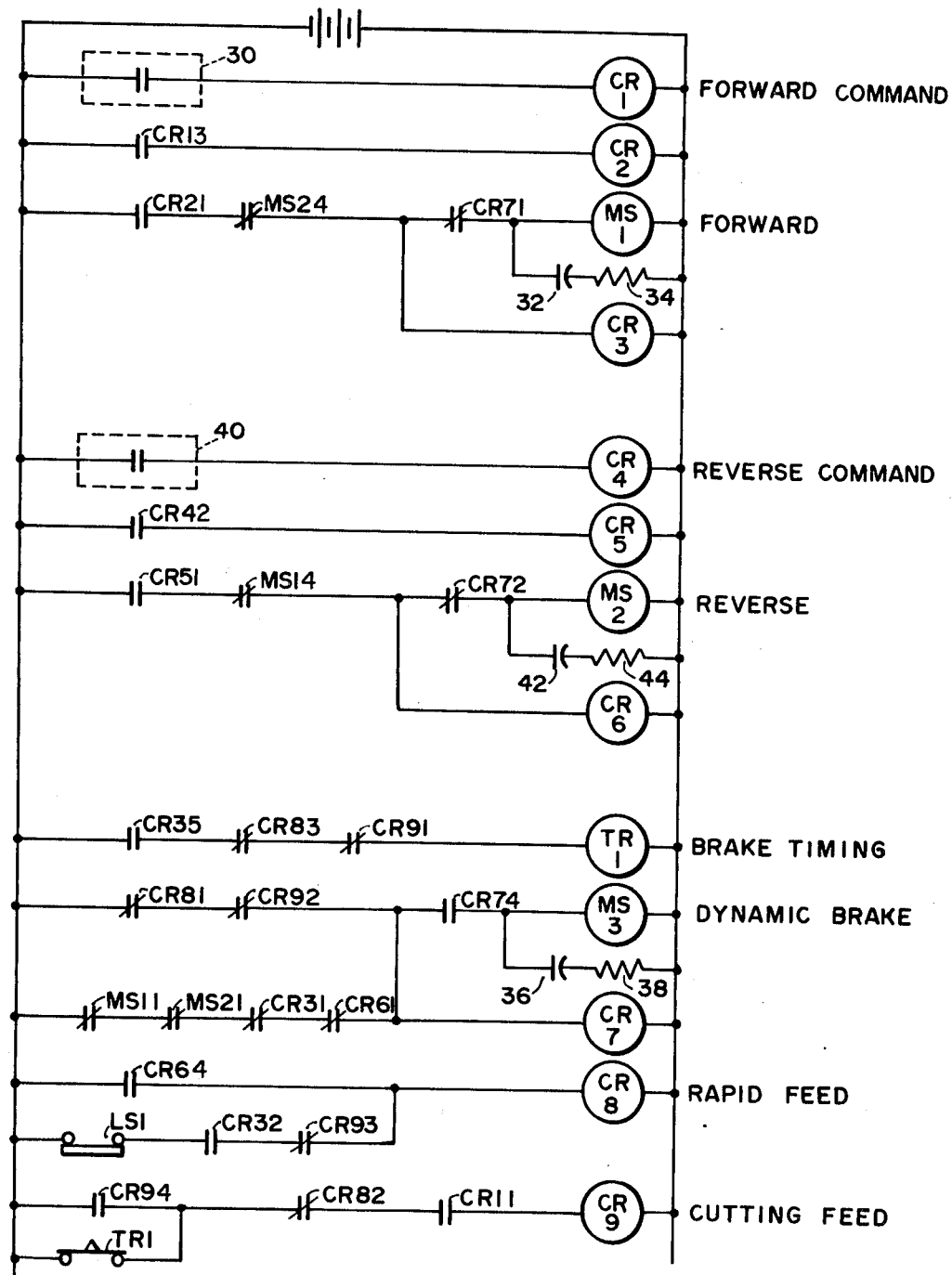
FIG. 2 is a circuit diagram of a sequencing circuit utilized with the embodiment of FIG. 1.

FIG. 2 illustrates sequencing circuits whose function is to insure the accurate forward and reverse switching of relay contact circuits 12 and 26 shown in FIG. 1. In the sequencing circuit, $CR_1$ through $CR_9$ denote current relays, $MS_1$ through $MS_3$ denote main relays and $TR_1$ denotes a timing relay.

Figure 3:
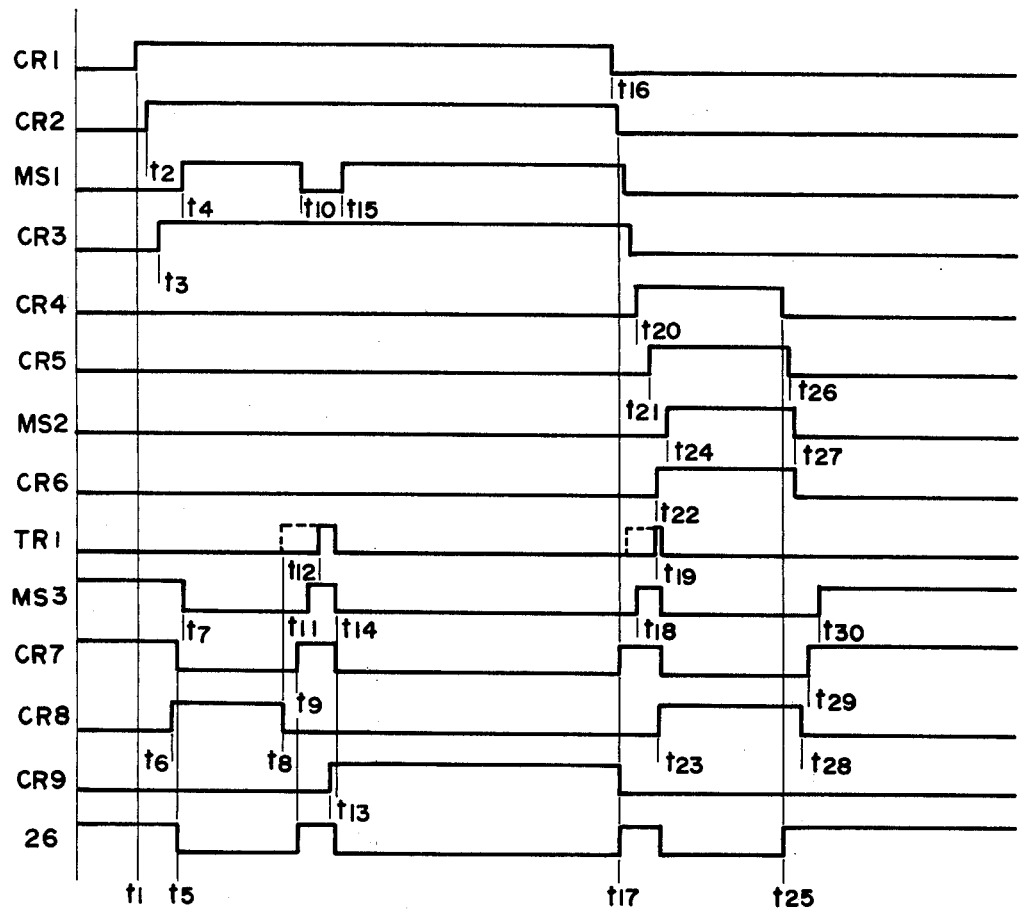
FIG. 3 illustrates a time chart of the sequencing circuit of FIG. 2.

FIG. 3 is a timing chart showing the functions of the sequencing circuit of FIG. 2. The functions of the relay contact circuits of the present invention are described hereinbelow in conjunction with FIGS. 2 and 3.

For the purposes of prior discussion and the following description, the contacts of a relay are identified as follows: $XY_{nm}$ where XY is the relay tape, n is an integer indicating the relay number and m is an integer indicating the contact number of the relay; i.e., $CR_{71}$ is the number 1 contact of the 7 current relay. Furthermore, relays $MS_1$, $MS_2$, $MS_3$, $CR_1$, $CR_3$, $CR_4$, $CR_6$ and $CR_7$ in the following description are those relays which control the relay contacts in the circuits of FIG. 1.

In operation, prior to the start of feeder movement, motor 10 is in a stationery state and relay $CR_7$ is on. Thereupon interlocking circuit 27 shuts off the basic current of transistor 16 so as to prevent any armature current from flowing into motor 10. The ON status of contact $CR_{74}$ also activates relay $MS_3$ which in turn causes the dynamo breaking circuit in motor 10 to activate. At time $t_1$ (FIG. 3) a forward command signal from contact 30 (FIG. 2) is relayed via relay $CR_{13}$ to contact $CR_1$ which activates relay $CR_2$ at $t_2$. The activation of relay contact $CR_{21}$ causes relay $CR_3$ to be activated at time $t_3$. Contact $CR_{21}$ also causes relay $MS_1$ to be activated at time $t_4$, which is slightly later than relay $CR_3$. This time delay is accomplished by a delay circuit comprised of a condenser 32 and a resistor 34.

Deactivation of contact $CR_{31}$ causes relay $CR_7$ to deactivate (at time $t_5$) whereupon interlocking circuit 27 is deactivated so as to enable the base current of transistor 16 to flow. By activation of $CR_{32}$, relay $CR_8$ is activated and contact $CR_{83}$ is deactivated (at time $t_6$) whereupon relay $TR_1$ cannot be activated even though contact $CR_{35}$ is activated. Relay $MS_3$ is deactivated by the deactivation of contact $CR_{81}$ (at time $t_7$). Thus, with the forward command signal the base interlock as well as the dynamo brake are released and relay $MS_1$ is activated which in turn activates contacts $MS_{12}$ and $MS_{13}$ and forward turn from servo control circuit 14 is supplied to motor 10.

While motor 10 is rotating in the forward direction a speed switching signal from a limit switch $LS_1$ causes relay $CR_8$ to deactivate (at time $t_8$) whereupon relay $CR_7$ is activated (at time $t_9$), and deactivation of contact $CR_{71}$ causes relay $MS_1$ to deactivate (at time $t_{10}$). Activation of contact $CR_{74}$ causes relay $MS_3$ to activate dynamo braking action after a time delay introduced by a delay circuit consisting of condenser 36 and resistor 38 (at time $t_{11}$). Contact $CR_{82}$ is activated at time $t_8$, but relay $TR_1$ is activated only after a prescribed time delay (at time $t_{12}$) and relay $CR_9$ is activated at time $t_{13}$). Relay $CR_1$ is deactivated by deactivation of contact $CR_{91}$ while relay $CR_9$ continues in the activator state by contact $CR_{94}$. Deactivation of contact $CR_{92}$ causes relays $MS_3$ and $CR_7$ to deactivate at time $t_{14}$ thereby releasing both the dynamo brake and transistor interlock. Activation of contacts $CR_{71}$ causes relay $MS_1$ to again activate (at time $t_{15}$) and thus the switching of the forward speed is accomplished. The switching operation described in the embodiment indicates decreasing times in the forward speed.

As the forward command is cancelled and contact 30 is deactivated, relay $CR_1$ is deactivated (at time $t_{16}$) followed by deactivation of relay $CR_2$ and relay $CR_9$ (at time $t_{17}$). Activation of contact $CR_{92}$ causes relay $C_7$ to activate, whereupon the base interlock is activated. A short while later relay $MS_3$ is activated (at time $t_{18}$) and still later relay $TR_1$ is activated (at time $t_{19}$). Thus, the dynamo braking and interlocking functions are performed in the same manner as in the above described speed switching operation.

Meanwhile, a reverse command activates contact 40, whereupon relay $CR_4$ is activated (at time $t_{20}$) while contact $CR_{42}$ activates relay $CR_5$ (at time $t_{21}$). Activation of contact $CR_{51}$ causes relay $CR_6$ to activate (at time $t_{22}$). Whereupon the activated contact $CR_{64}$ activates relay $CR_8$ (at time $t_{23}$) and deactivation of contacts $CR_{83}$ and $CR_{81}$ deactivates relays $TR_1$, $CR_7$ and $MS_3$. This action releases the brake interlock and motor 10 is in an unrestricted state. The above reverse preparations being completed, $MS_3$ is activated after a time delay introduced by a delay circuit made up of condensor 42 and resistor 44 (at time $t_{24}$). Thereafter motor 10 continues its reverse rotation.

Since the feeder has completed its desired reverse movement and has returned to its standard position, reverse command contact 40 is deactivated and relay $CR_4$ is deactivated (at time $t_{25}$). This deactivation causes contacts $CR_{12}$ and $CR_{41}$ of interlocking circuit 27 to activate thereby interlocking transistor 16. Thereafter contacts $CR_{51}$ and $MS_{22}$ and $MS_{23}$ and $CR_{64}$ are deactivated in succession at times $t_{26}$ and $t_{27}$ respectively whereupon the supply of armature current to motor 10 is stopped. Deactivation of $CR_{64}$ causes relay $CR_8$ to also deactivate (at time $t_{28}$). Activation of contact $CR_{81}$ activates relay $CR_7$ (at time $t_{29}$). Activation of contact $CR_{74}$ activates relay $MS_3$ at time $t_{30}$ thereby causing the feeder to stop and maintain its prescribed position.

As described above the forward and back controls, as well as the speed switching control of motor 10, are accomplished by the sequencer circuit of FIG. 2. Furthermore, it should be apparent that the driving circuit 18 and the comparator 22 could be common circuits which exist in the prior art.

In all cases it is understood that the above described embodiment is merely illustrative of but one of the many possible specific embodiments which represent the applications of the principles of the present invention. Furthermore numerous and varied other arrangements can be readily devised in accordance with the principles of the present invention by those skilled in the art without departing from the spirit and scope of the invention.

We claim:

1. A directional switching device for a feeder in a machine tool comprising:
   a direct current motor for driving a feeder at prescribed speed and with prescribed force;
   a relay contact circuit provided in an armature circuit of said motor, said relay contact circuit having forward relay contacts and reverse relay contacts each comprising two interlocking contacts; and
   a sequence circuit for switch-controlling said relay contact circuits according to forward and reverse commands, said sequence circuit comprising:
   a plurality of current relays;
   a plurality of main relays;
   at least one timing relay;

at least two independently actuated contacts each controlling one of said relays, one of said independently actuated contacts for forward commands and the other for reverse commands, and a plurality of relay contacts controlled by said current, main and timing relays, said plurality of relay contacts, current relays, main relays, timing relays and independently actuated contacts being arranged and configured to control said relay contact circuit in a predetermined sequence of operation when said forward and reverse commands are given and said main relays are activated when said main relays are supplied no current.

2. The switching device according to claim 1, wherein armature current is supplied to said direct current motor via a servo-control circuit.

3. The switching device of claim 2, wherein said servo control circuit comprises a switching element having a control electrode for controlling the armature current in said motor, and an interlocking circuit for shutting off the control electrode current of said switching element when there is no forward or reverse command.

4. The switching device according to claim 3, wherein said interlocking circuit shuts off said control electrode current during a prescribed time upon the command to switch the motor speed, even when a forward or reverse command is in effect.

5. A switching device according to claim 4 wherein said switching element comprises a transistor.

6. A switching device according to claim 5 wherein said servo-control circuit further comprises a driving circuit coupled to a base of said transistor and a comparator circuit having its output coupled to an input of said driving circuit, said comparator circuit having one of its inputs coupled to said interlocking circuit and another of its inputs coupled to said sequence circuit.

* * * * *